(12) United States Patent
Velikotny et al.

(10) Patent No.: US 7,183,535 B2
(45) Date of Patent: Feb. 27, 2007

(54) POSITION-TO-NUMBER ELECTRO-OPTICAL CONVERTER

(75) Inventors: Mikhail A. Velikotny, St. Petersburg (RU); Andrei B. Zobnin, St. Petersburg (RU); Vladimir I. Polyakov, St. Petersburg (RU)

(73) Assignee: Otkrytoe Aktsionernoe Obshestvo (OAO) "SKB IS" (RU)

( * ) Notice: Subject to any disclaimer, the term of this patent is extended or adjusted under 35 U.S.C. 154(b) by 0 days.

(21) Appl. No.: 10/562,864

(22) PCT Filed: Jun. 30, 2004

(86) PCT No.: PCT/RU2004/000259

§ 371 (c)(1),
(2), (4) Date: Dec. 29, 2005

(87) PCT Pub. No.: WO2005/003679

PCT Pub. Date: Jan. 13, 2005

(65) Prior Publication Data

US 2006/0145065 A1 Jul. 6, 2006

(30) Foreign Application Priority Data

Jul. 4, 2003 (RU) ............................... 2003120482

(51) Int. Cl.
*G01D 5/34* (2006.01)
(52) U.S. Cl. ............................... 250/231.13; 250/231.16
(58) Field of Classification Search ........... 250/231.13, 250/231.18, 231.16, 221; 341/11, 13
See application file for complete search history.

(56) References Cited

U.S. PATENT DOCUMENTS

| 4,442,351 | A |   | 4/1984  | Pfeifer |
|-----------|---|---|---------|---------|
| 4,477,189 | A |   | 10/1984 | Ernst   |
| 4,654,527 | A | * | 3/1987  | Schmitt .................. 250/237 G |
| 5,068,529 | A | * | 11/1991 | Ohno et al. ............ 250/231.18 |

(Continued)

FOREIGN PATENT DOCUMENTS

EP 0058302 8/1982

(Continued)

OTHER PUBLICATIONS

English Translation of Claims for SU 611109.

*Primary Examiner*—Georgia Epps
*Assistant Examiner*—Pascal M. Bui-Pho
(74) *Attorney, Agent, or Firm*—Rader, Fishman & Grauer PLLC

(57) ABSTRACT

An optoelectronic code-to-position encoder intended for measuring linear and angular travels of an object contains a coordinate scale with raster and code tracks, a readout unit, which includes a lighter, a raster analyzing mask, light detectors of the raster track and a multi-element light detector of the code track. The readout unit is fitted with a code analyzing mask, which is composed of two arrays of windows and optically conjugated with the code track of the coordinate scale; the multi-element light detector of the code track is made as two separate arrays of light detectors and is located behind the code analyzing mask. The inventive device makes it possible to eliminate a coordinate code readout ambiguity on a static initial position of a measured object and simultaneously increase the running speed, reduce the dimensions and increase the potential accuracy of the encoder.

3 Claims, 2 Drawing Sheets

U.S. PATENT DOCUMENTS

| | | | |
|---|---|---|---|
| 5,235,181 A | | 8/1993 | Durana et al. |
| 5,294,793 A | * | 3/1994 | Schwaiger et al. .... 250/231.16 |
| 5,563,408 A | * | 10/1996 | Matsumoto et al. ... 250/231.14 |
| 6,031,224 A | * | 2/2000 | Peterlechner .......... 250/231.13 |

FOREIGN PATENT DOCUMENTS

| | | |
|---|---|---|
| SU | 611109 | 8/1978 |
| SU | 1474843 | 4/1989 |

\* cited by examiner

POSITION-TO-NUMBER ELECTRO-OPTICAL CONVERTER

FIELD OF THE INVENTION

The invention concerns the field of measuring equipment and can be used for measuring linear and angular travels of an object.

BACKGROUND OF THE INVENTION

In an angular code encoder known from the USSR Author's Certificate No. 1474843, Int. class H03M 1/24, published in 1989, the reduction of a required shift of a signal readout unit is reached by the use of a row of light detecting windows, the number of the windows being determined by the digit capacity of the code used.

Although in this case the travel length of the preliminary moving of the readout unit is drastically reduced, it is not eliminated, which is explained by ambiguity of reading out the code of the readout unit position by light detecting windows of the analyzing mask.

The ambiguity of reading out the coordinate code can arise in case of a "critical" arrangement of the boundary of the code window with reference to the center of one of the analyzing windows, that is when it is not possible to reliably allocate values "0" or "1" to a signal of a respective light detector. Therefore, in order to eliminate the ambiguity in reading out the coordinate code, the analyzing mask (i.e. the readout unit) has to be moved additionally.

Hence, when determining the coordinate code after switching on the encoder, the above-mentioned shift of the readout unit becomes mandatory, which is inadmissible in some occasions.

Another position encoder is known from the U.S. Pat. No. 5,235,181, Int. class G01D 5/34, published in 1993, and chosen as the prototype for this invention of a code-to-position optoelectronic encoder.

This encoder contains a coordinate scale with a raster track and a code track, the first one being made as a chain of windows forming a regular raster and the second one being made as a code chain of windows, a readout unit comprising a lighter, a lens, projecting the illuminated track of the code windows onto a light-sensitive surface of a CCD (multi-element light detector), and a raster analyzing mask, which forms optic raster conjugation with the raster track of the coordinate scale and respective light detectors arranged behind it. The encoder also contains recording and analyzing units. The CCD detector of this encoder generates a video signal, which is a chain of unipolar pulses, the envelope of which is adequate to the distribution of luminance over its light-sensitive surface. Hence the video signal fully represents a current image of a section of the code track in the coordinates of the CCD array.

The analysis of the video signal, which corresponds to the coordinate code, makes it possible to determine the position of the readout unit, with the ambiguity of reading out the code information being obviated.

DISCLOSURE OF THE INVENTION

The object of the invention is to obviate the ambiguity of reading a coordinate code when the object of measurements is at its static initial position, with concurrent increasing the speed of response and potential accuracy of the code position optoelectronic encoder while reducing its overall dimensions.

To achieve the above object, a code-to-position optoelectronic encoder is provided comprising a coordinate scale with a raster track and a code track, the raster track being made as a chain of windows forming a regular raster and the code track being made as a code chain of windows, a readout unit comprising a lighter, a raster analyzing mask made as separate links of regular raster windows and optically conjugated with the raster track of the coordinate scale, light detectors of the raster track arranged behind the raster analyzing mask, a multi-element light detector of the code track, a recording unit and an analyzing unit. The light detector of the raster track and the multi-element light detector of the code track are connected to the recording and the analyzing units, respectively. The readout unit is provided with a code analyzing mask that makes up two lines of windows with a period divisible by a code pitch and the width of each window equal to the code pitch. The windows of the code analyzing mask are mutually shifted by a value equal to half of the code pitch and initial spatial phases of the raster analyzing mask and one of the track of the code analyzing mask are aligned. The total width of the tracks of the code analyzing mask is less than the height of the windows of the coordinate scale code track. The multi-element light detector is located behind the code analyzing mask, which is optically conjugated with the coordinate scale code track and is composed of two separate light detector arrays, each of which corresponds to a particular track of the code analyzing mask; the readout unit lighter includes a LED placed in a focal plane of a condenser, and the raster and code analyzing masks are made as a single part.

As compared to the prior art, by providing a code analyzing mask, optically conjugated with the coordinate scale code track; the code analyzing mask including two arrays of windows with a period divisible by a code pitch and a width of each window equal to the code pitch; by shifting windows of one track with reference to another track by half of the code pitch; by alignment of initial spatial phases of the raster analyzing mask and one of the tracks of the code analyzing mask; and by arranging the multi-element light detector behind the code analyzing mask, the multi-element light detector including two separate arrays of light detectors and each of them corresponding to a particular track of the code analyzing mask, the proposed code-to-position optoelectronic encoder made it possible to:
  increase the speed of response of the encoder by drastic reduction of the number of light detecting elements polled, with the possibility of parallel polling thereof;
  increase potential accuracy of the encoder due to the fact that the code analyzing mask is located in immediate closeness to the coordinate scale, which practically obviates the influence of angular shift of a readout unit carriage on potential accuracy;
  reduce overall dimensions due to excluding a projecting lens.

BRIEF DESCRIPTION OF DRAWINGS

The invention is explained by a detailed description of an example of its implementation with references to accompanying drawings, in which.

DETAILED DESCRIPTION OF THE INVENTION

Figure 1:
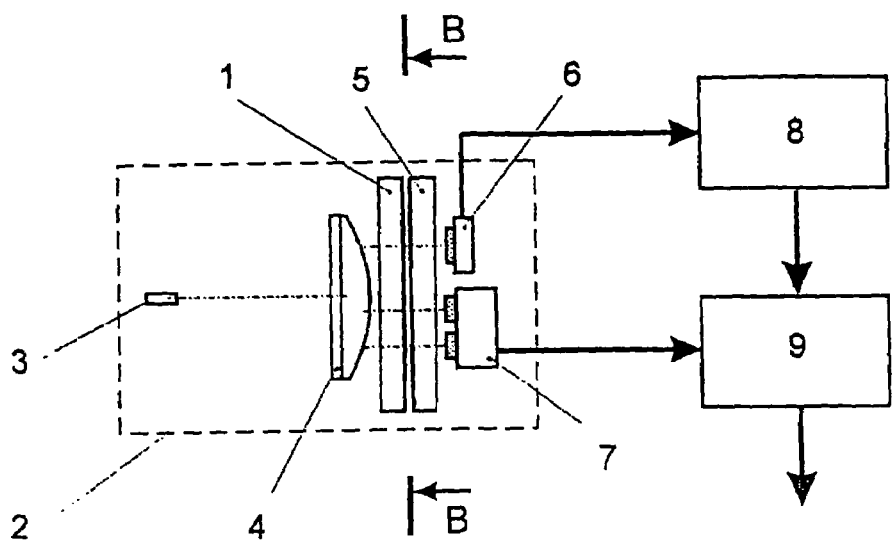
FIG. 1 illustrates a structural chart of the optoelectronic code-to-position encoder with a front view of a readout unit shown therein.
Figure 2:
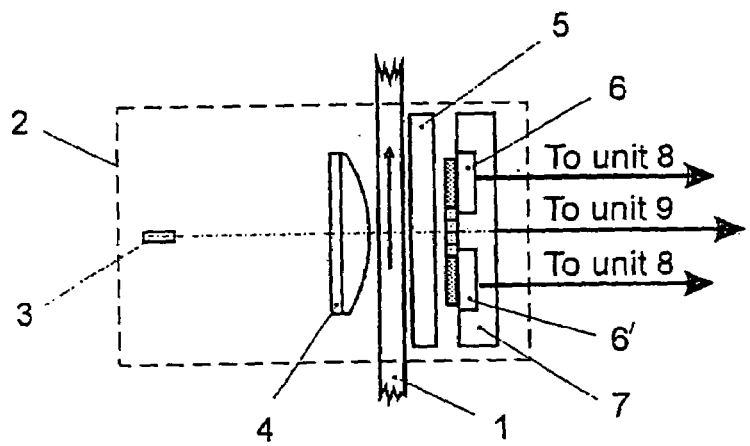
FIG. 2 shows a plan view of the readout unit of FIG. 1.

According to the invention the optoelectronic code-to-position encoder (FIGS. 1, 2) contains a coordinate scale 1, a readout unit 2, which is composed of optically conjugated LED 3, a condenser 4, an analyzing mask 5, raster track light detector 6 and a multi-element light detector 7 of a code track. The LED 3 and condenser 4 form a lighter. The analyzing mask 5 includes a raster analyzing mask and a code analyzing mask. The raster track light detectors 6 and code track multi-element light detector 7 are connected to a recording unit 8 and an analyzing unit 9, respectively. The units 8 and 9 are interconnected.

Figure 3:
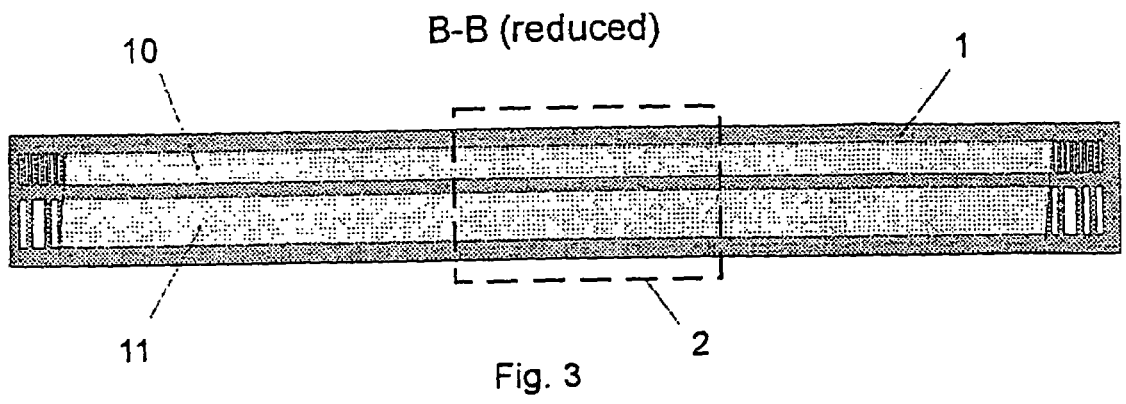
FIG. 3 depicts the coordinate scale and the readout unit in the section B—B of FIG. 1.

The coordinate scale 1 (FIGS. 3 and 4) has a raster track 10 and a code track 11. The raster track 10 is made as an array of windows forming a regular raster and code track 11 is made as a code array of windows.

The analyzing mask 5 (FIG. 5) includes a raster analyzing mask, which is made in the form of separate links 12 and 12' of regular raster windows, and a code analyzing mask made as two tracks 13 and 13'.

Windows of the tracks 13 and 13' of the code analyzing mask (FIG. 5) are arranged at a period k·L divisible by a code pitch L (FIG. 4) and with a window width equal to L (the code pitch). The windows of the tracks 13 and 13' (FIG. 5) of the code analyzing mask are mutually shifted by a value equal to L/2 (half of the code pitch).

Initial spatial phases in links 12 and 12' of the raster analyzing mask are mutually shifted by a value equal to $\pi/2$, that is by L/4.

Figure 4:
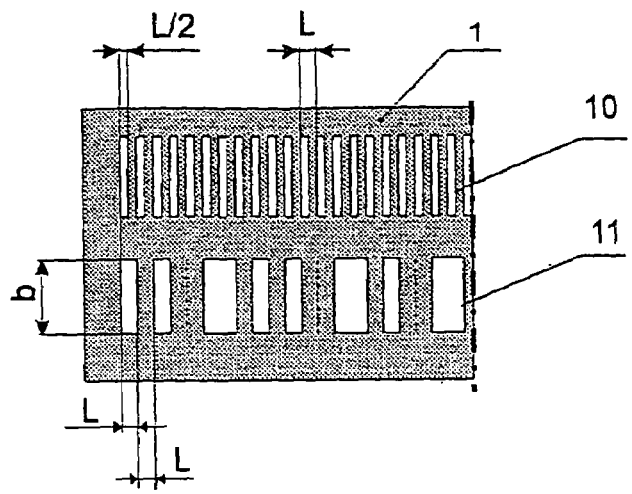
FIG. 4 shows a fragment of the coordinate scale.
Figure 5:
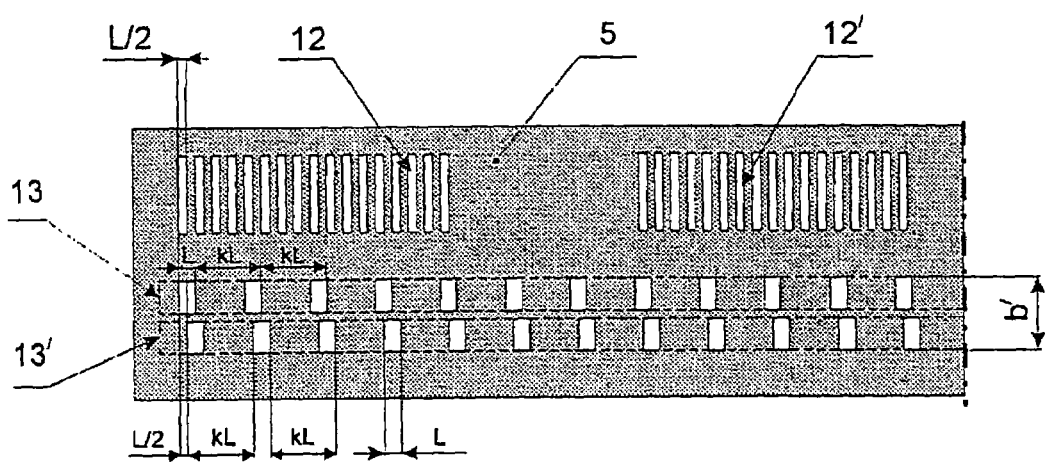
FIG. 5 illustrates a fragment of an analyzing mask, including a raster and a code analyzing masks.
Figure 6:
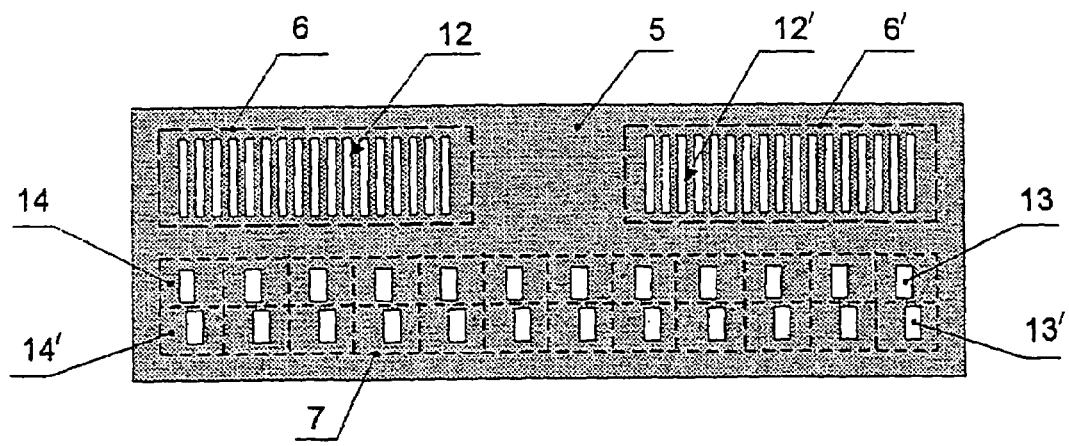
FIG. 6 shows the analyzing mask and a multi-element light detector.

The initial spatial phases of the raster analyzing mask—the link 12 and of the code analyzing mask track 13 are aligned (FIG. 5);

A total width b' of the tracks 13 and 13' of the code analyzing mask (FIG. 5) is less than a height b of the windows of the code track 11 of the coordinate scale 1 (FIG. 4). The multi-element light detector 7 of the code track (FIG. 6) includes two separate arrays 14 and 14' of light detectors, each of which corresponds to a definite track of the tracks 13 and 13' (FIGS. 5, 6) of the code analyzing mask, and each of the light detectors 6 and 6' of the raster track 10 corresponds to a definite link of the links 12 and 12' of regular raster windows of the raster analyzing mask.

INDUSTRIAL APPLICABILITY

Essentially, the operation of the encoder is to reliably determine if the spatial phase of the code track 11 is maintained within the value equal to L/4 with the reference to the zero phase of the code analyzing mask.

If this condition is met, signals of light detecting elements corresponding to the array 13 of the code analyzing mask have to be accepted for processing. Otherwise signals of light detecting elements of the array 13' shall be subjected to decoding.

The said information if formed with the aid of the analyzing link of the raster windows 12 and 12', which correspond to the track 10 of the regular raster of the coordinate scale 1.

In these windows, rasters are marked with the same pitch equal to the pitch of regular raster of the track 10 but shifted relative to each other by the spatial phase value equal to $\pi/2$ that is by ¼ of the raster pitch. In this case phases of the raster of one of the windows are aligned with the zero phase of the track 13 of the code analyzing mask.

For a static position of the encoder elements the comparison of signals $U_0$ and $U_{90}$ read out of the raster track light detectors 6 and 6' conjugated with the said windows makes it possible to take a decision on using one or another of the tracks 13 and 13' of the code analyzing mask that is to read out from light detecting elements of appropriate array 14 and 14' of the multi-element light detector 7.

The said comparison is carried out by the recording unit 8. The result of the comparison is transmitted to the analyzing unit 9, which probes light detecting elements of the selected array 14 or 14', forms the position code of the readout unit 2, and decodes the same.

The information obtained corresponds to the position of the readout unit 2 with reference to the coordinate scale 1 with an accuracy of L/2.

The coordinate information is specified by processing orthogonal signals of the light detectors 6 and 6' by a standard interpolator, which is included in the recording unit 8.

Summing up the data of rough and fine counting and forming results in the format required is performed by the analyzing unit 9, the outlet of which is the outlet of the encoder.

Hence the present invention makes it possible to obviate the ambiguity of reading the coordinate code at the static initial position of the object of measurements and at the same time to increase the speed of response, to reduce overall dimensions and to increase potential accuracy of the encoder.

What is claimed is:

1. An optoelectronic code-to-position encoder, comprising:
    a coordinate scale with a raster track and a code track, the former including an array of windows forming a regular raster and the latter including a code array of windows,
    a readout unit comprising a lighter, a raster analyzing mask including separate links of the regular raster windows and optically conjugated with the raster track of the coordinate scale, light detectors of the raster track arranged behind the raster analyzing mask, and a multi-element light detector of the code track, and
    a recording unit and an analyzing unit,
    the light detectors of the raster track and the multi-element light detector being connected to the recording and analyzing units respectively, characterized in that
    the readout unit is provided with a code analyzing mask including two arrays of windows with a period divisible by a code pitch and a width of each of said windows equal to the code pitch,
    the windows of the code analyzing mask are shifted with regard to each other by a value equal to half of the code pitch,
    initial spatial phases of the raster analyzing mask and one of the tracks of the code analyzing mask are aligned;
    the total width of tracks of the code analyzing mask is less than the height of windows of the code track of the coordinate scale,
    the multi-element light detector is located behind the code analyzing mask optically conjugated with the code track of the coordinate scale and includes two separate arrays of light detecting elements, each of the arrays corresponding to a definite track of the code analyzing mask.

2. The optoelectronic code-to-position encoder as claimed in claim 1, characterized in that the readout unit lighter includes a LED and a condenser, the LED being placed in a focal plane of the condenser.

3. The optoelectronic code-to-position encoder as claimed in claim 1, characterized in that the raster mask and the code analyzing mask are made as a single part.

* * * * *